(12) United States Patent
Chang et al.

(10) Patent No.: US 8,300,403 B2
(45) Date of Patent: Oct. 30, 2012

(54) COMPUTER SYSTEM AND HEAT SINK

(75) Inventors: Yao-Ting Chang, Tu-Cheng (TW); Meng-Hsien Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 201 days.

(21) Appl. No.: 12/975,256

(22) Filed: Dec. 21, 2010

(65) Prior Publication Data

US 2012/0127654 A1　May 24, 2012

(30) Foreign Application Priority Data

Nov. 18, 2010　(TW) .................................. 99139632

(51) Int. Cl.
*H05K 7/20* (2006.01)
*G06F 1/20* (2006.01)
*F28F 7/00* (2006.01)

(52) U.S. Cl. ......... 361/679.47; 361/679.46; 361/379.54; 361/688; 361/690; 361/697; 361/703; 361/704; 361/709; 361/710; 361/719; 361/720; 165/80.2; 165/80.3; 165/104.33; 165/104.34; 165/185; 174/16.3; 174/252; 257/706; 257/721; 257/722

(58) Field of Classification Search ............ 361/679.46–679.54, 688–697, 700–712, 715–722; 165/80.2, 165/80.3, 80.4, 80.5, 104.33, 104.34, 121–126, 165/185; 174/16.3, 252; 257/706–727; 454/184; 29/832, 840, 841, 842, 890.03
See application file for complete search history.

(56) References Cited

U.S. PATENT DOCUMENTS

| | | | |
|---|---|---|---|
| 6,215,662 B1 * | 4/2001 | Peter et al. ..................... | 361/704 |
| 6,888,725 B2 * | 5/2005 | Kubo et al. ..................... | 361/719 |
| 7,391,618 B2 * | 6/2008 | Fujiya et al. ................... | 361/727 |
| 7,613,001 B1 * | 11/2009 | Liu et al. ......................... | 361/700 |
| 7,719,842 B2 * | 5/2010 | Kreissig et al. ................ | 361/719 |
| 7,990,704 B2 * | 8/2011 | Cheng ............................ | 361/690 |
| 2004/0188063 A1 * | 9/2004 | Chang ............................ | 165/80.3 |

* cited by examiner

*Primary Examiner* — Michail V Datskovskiy
(74) *Attorney, Agent, or Firm* — Altis Law Group, Inc.

(57) ABSTRACT

A computer system includes an enclosure having an air intake, a heat sink and an electronic element. The heat sink includes a first heat dissipating portion, a second heat dissipating portion, and a third heat dissipating portion interconnecting the first and second heat dissipating portions. Each of the first heat dissipating portion, second heat dissipating portion, and third heat dissipating portion includes a number of fins and passages formed between each two adjacent fins. The passages of the first heat dissipating portion face toward the air intake. A space is maintained between the first heat dissipating portion and the second heat dissipating portion, and the electronic element is mounted in the space.

12 Claims, 1 Drawing Sheet

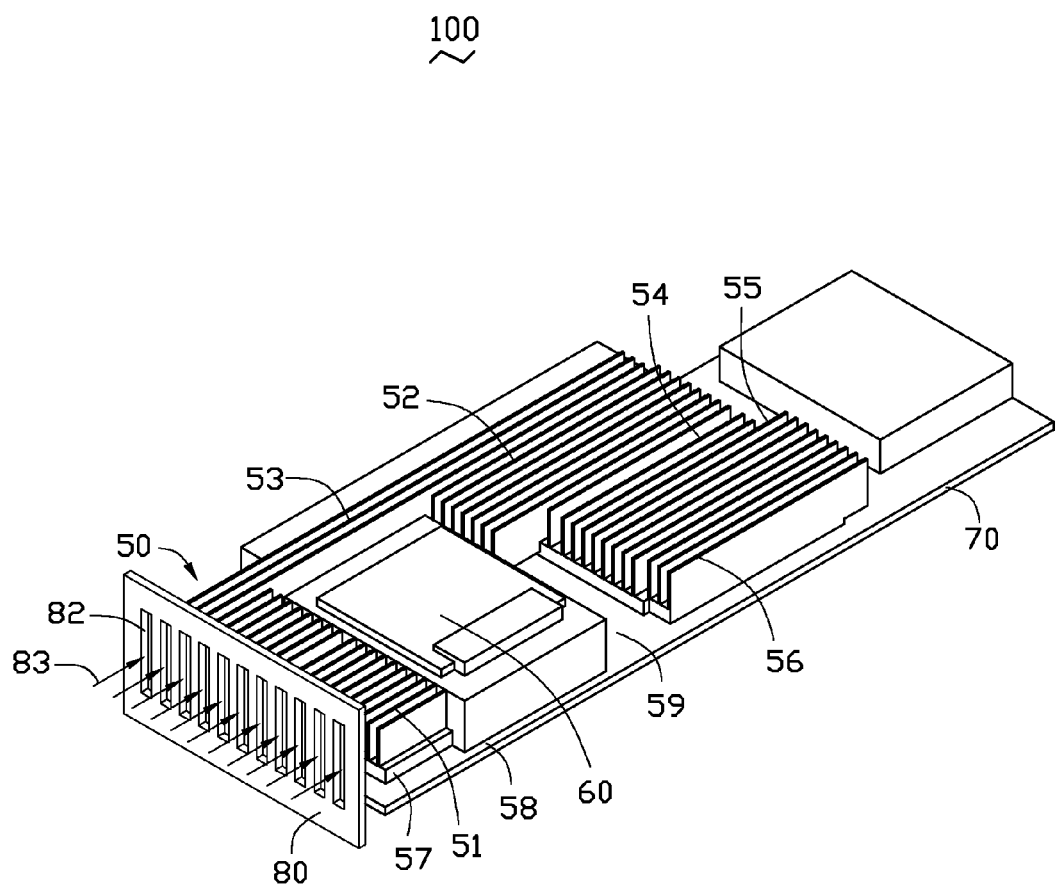

COMPUTER SYSTEM AND HEAT SINK

BACKGROUND

1. Technical Field

The present disclosure relates to computer hardware and heat sinks, and particularly to a computer system having a heat sink.

2. Description of Related Art

Heat sinks dissipate heat from heat generating elements, such as electronic elements in computer systems. As electronic systems become more compact, arrangement of the electronic elements and the heat sink in a computer system become more critical. In some situations, airflow around the heat sink is impeded by one or more electronic elements, reducing heat dissipation efficiency.

What is needed, therefore, is a computer system and heat sink, which can overcome the above shortcomings.

BRIEF DESCRIPTION OF THE DRAWINGS

Many aspects of the present computer system and heat sink can be better understood with reference to the following drawing. The components in the drawing are not necessarily drawn to scale, the emphasis instead being placed upon clearly illustrating the principles of the present computer system and heat sink.

The drawing is a schematic view of a computer system in accordance with one embodiment.

DETAILED DESCRIPTION

Embodiments of the computer system and heat sink will now be described in detail below and with reference to the drawing.

Referring to the drawing, a computer system 100 having a heat sink 50, in accordance with one embodiment, is provided. The computer system 100 further has an enclosure 80 having a number of air intakes 82, and an electronic element 60. In the drawing, arrows 83 indicating an airflow direction through the air intakes 82 are shown. In the present embodiment, the enclosure 80 is only shown as a plate. In other embodiment, the enclosure 80 may surround the heat sink 50 the electronic element 60 therein.

The heat sink 50 includes at least a first heat dissipating portion 51, a second heat dissipating portion 52, and a third heat dissipating portion 53. The third heat dissipating portion 53 connects the first heat dissipating portion 51 to the second heat dissipating portion 52. In the present embodiment, the heat sink 50 further includes a fourth heat dissipating portion 54, a fifth heat dissipating portion 55, and a sixth heat dissipating portion 56. The fourth heat dissipating portion 54 is adjacent to the second heat dissipating portion 52, the fifth heat dissipating portion 55 is adjacent to the fourth heat dissipating portion 54, and the sixth heat dissipating portion 56 is adjacent to the fifth heat dissipating portion 55.

Each of the heat dissipating portions includes a number of fins and a number of passages arranged between adjacent fins. The fins are substantially rectangular, and are arranged parallel with each other along the direction of airflow. The passages of the first heat dissipating portion 51 are aligned with and face toward the air intakes 82. In order to achieve a high heat dissipation efficiency, the first heat dissipating portion 51 is arranged adjacent to the air intakes 82.

The fins of the corresponding heat dissipating portion have a same length, and the fins of adjacent heat dissipating portions have different length.

The first heat dissipating portion 51 opposes the second heat dissipating portion 52, the fourth heat dissipating portion 54, the fifth heat dissipating portion 55, and the sixth dissipating portion 56, and spaces 58, 59 are defined between the first heat dissipating portion 51 and each one of the second heat dissipating portion 52, the fourth heat dissipating portion 54, the fifth heat dissipating portion 5,5 and the sixth dissipating portion 56.

The third heat dissipating portion 53 extends across the space 58 extending from the first heat dissipating portion 51 to the second heat dissipating portion 52. The space 58 serves as a mounting area for the electronic element 60. The electronic element 60 can be a heat generating element, and the heat sink 50 can dissipate the heat generated by the electronic element 60. It is understood that the heat sink 50 can further dissipate heat from other electronic elements in the computer system.

The space 59 can also serve as a mounting area for another electronic element (not shown), which may have a smaller size.

The computer system 100 further includes a circuit board 70, and the heat dissipating portions and the electronic elements are mounted on the circuit board 70. In particular, the first heat dissipating portion 51 is arranged adjacent to a peripheral side of the circuit board 70 in a manner such that no other electronic element is arranged between the first heat dissipating portion 51 and the peripheral side of the circuit board 70, and thus the airflow for the first heat dissipating portion 51 is completely not impeded.

The fins are made of heat conducting material, such as aluminum and copper. The fins are formed on a heat conducting base 57, and the heat conducting base 57 is mounted on the circuit board 70.

Concluded from the above, the heat sink of the present disclosure includes a number of heat dissipating portions, and passages of one of the heat dissipating portions align with and face toward the airflow direction, so that airflow is not impeded. In addition, the space defined among the heat dissipating portions can serve as a mounting area for receive electronic elements.

It is understood that the heat sink 50 can be used in other electronic systems in addition to the computer system, such as an image projection system.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A computer system comprising:

an enclosure having an air intake; and a heat sink, wherein the heat sink comprises a first heat dissipating portion, a second heat dissipating portion and a third heat dissipating portion connecting the first heat dissipating portion and the second heat dissipating portion, each of the first heat dissipating portion, second heat dissipating portion and third heat dissipating portion comprising a plurality of fins and a plurality of passages formed between each two adjacent fins, the first heat dissipating portion being adjacent to the air intake, the passages of the first heat dissipating portion facing towards the air intake, the first heat dissipating portion being opposite to the second heat dissipating portion, a space being maintained between the first heat dissipating portion and the second heat dissipating portion; and an electronic element arranged between the first and second heat dissipating portions in the space.

2. The computer system of claim 1, wherein the heat sink further comprises a fourth heat dissipating portion adjacent to the second heat dissipating portion, the fourth heat dissipating portion comprises a plurality of spaced fins, the first heat dissipating portion is opposite to the fourth heat dissipating portion, and a space is maintained between the first heat dissipating portion and the fourth heat dissipating portion, and a length of each of the fins of the second heat dissipating portion differs from that of each of the fins of the fourth heat dissipating portion.

3. The computer system of claim 2, wherein the heat sink further comprises a fifth heat dissipating portion adjacent to the fourth heat dissipating portion, and a sixth heat dissipating portion adjacent to the fifth heat dissipating portion, each of the fifth heat dissipating portion and the sixth heat dissipating portion comprises a plurality of spaced fins, and a space is maintained between the first heat dissipating portion and each of the fifth heat dissipating portion and the sixth heat dissipating portion, a length of each of the fins of one of the fourth heat dissipating portion, fifth heat dissipating portion and sixth heat dissipating portion differs from that of the fins of adjacent the other one of the fourth heat dissipating portion, fifth heat dissipating portion and the sixth heat dissipating portion.

4. The computer system of claim 3, wherein the fins of each of the first heat dissipating portion, second heat dissipating portion, third heat dissipating portion, fourth heat dissipating portion, fifth heat dissipating portion and sixth heat dissipating portion have a same length.

5. The computer system of claim 1, wherein the fins of the first heat dissipating portion, second heat dissipating portion and third heat dissipating portion are parallel with each other.

6. The computer system of claim 1, wherein the third heat dissipating portion extends across the space from the first heat dissipating portion to the second heat dissipating portion.

7. The computer system of claim 1, further comprising a circuit board, the heat dissipating portions and the electronic element are mounted on the circuit board, and the first heat dissipating portion is adjacent to a peripheral side of the circuit board.

8. A heat sink comprising a first heat dissipating portion, a second heat dissipating portion and a third heat dissipating portion connecting the first heat dissipating portion and the second heat dissipating portion, wherein each of the first heat dissipating portion, second heat dissipating portion and third heat dissipating portion comprises a plurality of fins and a plurality of passages maintained between each two adjacent fins, the first heat dissipating portion is opposite to the second heat dissipating portion, and a space is maintained between the first heat dissipating portion and the second heat dissipating portion and configured for mounting an electronic element therein.

9. The heat sink of claim 8, further comprising a fourth heat dissipating portion arranged adjacent to the second heat dissipating portion, wherein the fourth heat dissipating portion comprises a plurality of fins and a plurality of passages arranged between each two adjacent fins, the first heat dissipating portion is opposite to the fourth dissipating portion, and a space is maintained between the first dissipating portion and the fourth dissipating portion, a length of each of the fins of the second dissipating portion differs from that of each of the fins of the fourth dissipating portion.

10. The heat sink of claim 9, wherein the fins of the first heat dissipating portion, second heat dissipating portion, third heat dissipating portion and fourth heat dissipating portion are parallel with each other.

11. The heat sink of claim 8, wherein the third heat dissipating portion extends across the space from the first heat dissipating portion to the second heat dissipating portion.

12. The heat sink of claim 8, further comprising a circuit board, the heat dissipating portions and the electronic element are mounted on the circuit board, and the first heat dissipating portion is adjacent to a peripheral side of the circuit board.

* * * * *